(12) United States Patent
Nishiyama et al.

(10) Patent No.: US 6,188,059 B1
(45) Date of Patent: Feb. 13, 2001

(54) PHOTOCURRENT MONITOR CIRCUIT AND OPTICAL RECEIVER

(75) Inventors: Naoki Nishiyama; Satoshi Takahashi; Mitsuaki Nishie, all of Yokohama (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/238,145

(22) Filed: Jan. 28, 1999

(30) Foreign Application Priority Data

Jan. 30, 1998 (JP) .................................................. 10-019073

(51) Int. Cl.[7] ....................................................... H01J 40/14
(52) U.S. Cl. ....................................... 250/214 R; 250/214.1
(58) Field of Search ........................... 250/214 R, 214 A, 250/214 LA, 214 LS, 214.1; 327/513, 514, 515

(56) References Cited

U.S. PATENT DOCUMENTS

| 4,085,411 | 4/1978 | Genesi . |
|---|---|---|
| 4,454,416 | 6/1984 | Gontowski, Jr. et al. . |
| 4,479,052 | 10/1984 | Suzuki . |
| 4,495,410 | 1/1985 | Minami et al. . |
| 4,599,527 | 7/1986 | Beaudet et al. . |
| 4,730,128 | 3/1988 | Seki . |
| 5,256,986 | 10/1993 | Flocke et al. . |
| 5,270,533 | 12/1993 | Pulice . |
| 5,548,112 | 8/1996 | Nakase et al. . |
| 5,981,936 | * 11/1999 | Fujiie ............................. 250/214 A |

* cited by examiner

Primary Examiner—Que T. Le
(74) Attorney, Agent, or Firm—Smith, Gambrell & Russell, LLP

(57) ABSTRACT

Since this photocurrent monitor circuit can detect, by way of first and second current mirror circuits 2F, 2R, a current proportional to the photocurrent flowing into a photodiode 1 from a photocurrent monitor terminal IMT, it can monitor the correct photocurrent without its detecting circuit influencing the photocurrent of the photodiode itself.

5 Claims, 3 Drawing Sheets

PHOTOCURRENT MONITOR CIRCUIT AND OPTICAL RECEIVER

BACKGROUND OF THE INVENTION

1. Field of the Invention

The present invention relates to a photocurrent monitor circuit for detecting a photocurrent flowing through a photodiode for receiving an optical signal, and an optical receiver equipped with the photocurrent monitor circuit.

2. Related Background Art

Optical receivers have been employed in communications using optical fibers and the like. Such an optical receiver is equipped with an avalanche photodiode (APD) for receiving optical signals. Usually, a bias voltage of over 80 V is applied to the APD.

SUMMARY OF THE INVENTION

The photocurrent cannot be detected correctly, because its detecting circuit influences the photocurrent. It is thus an object of the present invention to provide a photocurrent monitor circuit which can correctly monitor the photocurrent flowing through a photodiode, and an optical receiver equipped therewith.

The photocurrent monitor circuit in accordance with the present invention comprises a photodiode for receiving an optical signal; a first current mirror circuit having two parallel lines with respective currents flowing therethrough in proportion to each other, one of the lines connecting with one end of the photodiode; a second current mirror circuit having one of parallel lines connected to the other line of the first current mirror circuit; and a photocurrent monitor terminal connected to the other of the parallel lines of the second current mirror circuit.

Since this photocurrent monitor circuit can detect a current which is in proportion to the photocurrent flowing through the photodiode at the photocurrent monitor terminal, it can monitor the correct photocurrent without its detecting circuit influencing the photocurrent of the photodiode itself.

Preferably, the first and second current mirror circuits are constituted by bipolar transistors having polarities opposite to each other. Namely, in this configuration, connecting bipolar transistors having opposite polarities in series can make their current flowing directions coincide with each other, thus simplifying the circuit configuration.

Preferably, the photodiode is an avalanche photodiode, whereas one of the bipolar transistors constituting the first current mirror circuit has a collector connected to the photodiode and an emitter connected to a multiplication factor control circuit for supplying a bias potential with a positive temperature coefficient to the emitter.

The multiplication factor of an avalanche photodiode has a temperature dependence and a bias voltage dependence. Here, in the avalanche photodiode, the temperature dependence of its multiplication factor can be compensated for when a potential with a positive temperature coefficient is given as its bias voltage. The collector potential of the transistor in the first current mirror circuit is uniquely determined by the emitter potential, because the base and collector are short-circuited.

As a consequence, if a multiplication factor control circuit is connected to the emitter, and a potential with a positive temperature coefficient is supplied thereto, then the temperature coefficient of its multiplication factor can be compensated.

Preferably, the multiplication factor control circuit comprises a temperature compensation circuit in which a Zener diode having a positive temperature coefficient and a transistor whose base-emitter voltage has a negative temperature coefficient. The temperature compensation circuit and the transistor are connected in parallel such as to yield a positive temperature coefficient on an output. The multiplication factor control circuit has an output connected to the emitter of the first current mirror circuit.

Namely, when a Zener diode and a transistor having temperature coefficients with polarities opposite to each other are connected in parallel, then the temperature coefficient of their output potential can be adjusted according to contributions of the individual devices.

The optical receiver in accordance with the present invention further comprises a transimpedance amplifier connected to the other end of the photodiode.

While the photocurrent from the photodiode is indirectly monitored as mentioned above, the direct photocurrent is converted into a voltage via the transimpedance amplifier.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, an optical receiver equipped with a photocurrent monitor circuit in accordance with an embodiment will be explained with reference to an optical module as an example. Here, constituents identical to each other or having functions identical to each other will be referred to with numerals or letters identical to each other, without their overlapping explanations being repeated.

Figure 1:
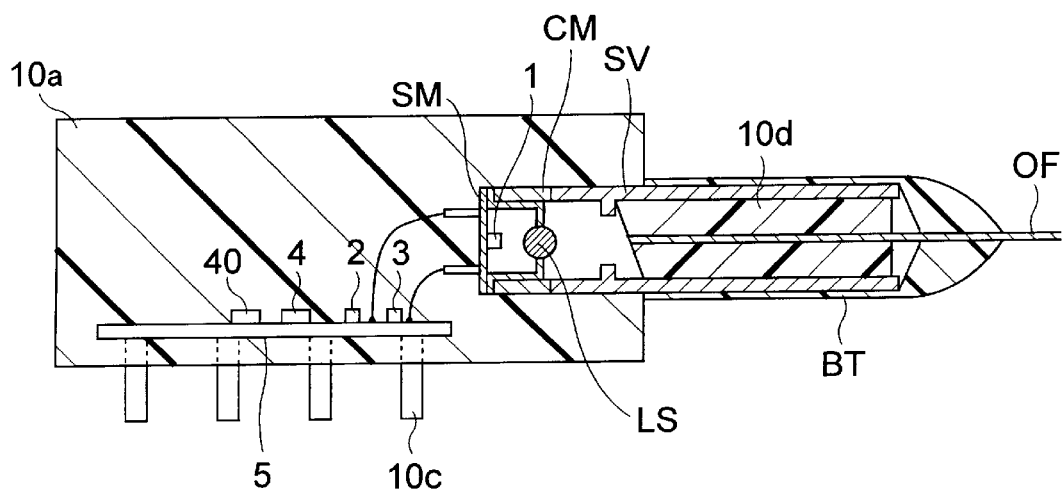
FIG. 1 is a vertical sectional view of the optical module in accordance with an embodiment.

FIG. 1 is a vertical sectional view of an optical module 10 in accordance with an embodiment. A sleeve SV is embedded within a resin material 10a, whereas an optical fiber OF surrounded by a ferrule 10d is disposed within the sleeve SV. The end face of the optical fiber OF within the sleeve SV opposes an avalanche photodiode (APD) 1. The APD 1 is secured to the inside of a lid member SM for sealing one end of the opening of the sleeve SV, and receives the signal light inputted from the optical fiber OF via a spherical lens LS secured within the sleeve SV.

In this embodiment, a multiplication factor control circuit 40, a current mirror circuit 2, a transimpedance amplifier 3, and a data discrimination and regeneration circuit/clock extraction circuit 4 are mounted on a wiring board 5 and are molded within the resin material 10a.

More specifically, one terminal of the APD 1 is electrically connected to the multiplication factor control circuit 40, whereas the other terminal thereof is electrically connected to the transimpedance amplifier 3. The bias voltage to the APD 1 is adjusted by the multiplication factor control circuit 40. If an optical signal from the optical fiber OF is fed into the APD 1, then the magnitude of current flowing therethrough will vary in response to the optical signal. This current is fed to the transimpedance amplifier 3, converted to voltage signal, and outputted as the voltage signal corresponding to the optical signal.

The transimpedance amplifier 3 is connected to the data discrimination and regeneration circuit/clock extraction circuit 4. The data discrimination and regeneration circuit/clock extraction circuit 4 discriminates and regenerates the data and extracts their clock contained in the data. Here, the data discrimination and regeneration circuit/clock extraction circuit 4 includes a main amplifier circuit which is not illustrated. In the following, the circuit configuration of the above-mentioned optical module will be explained in detail.

Figure 2:
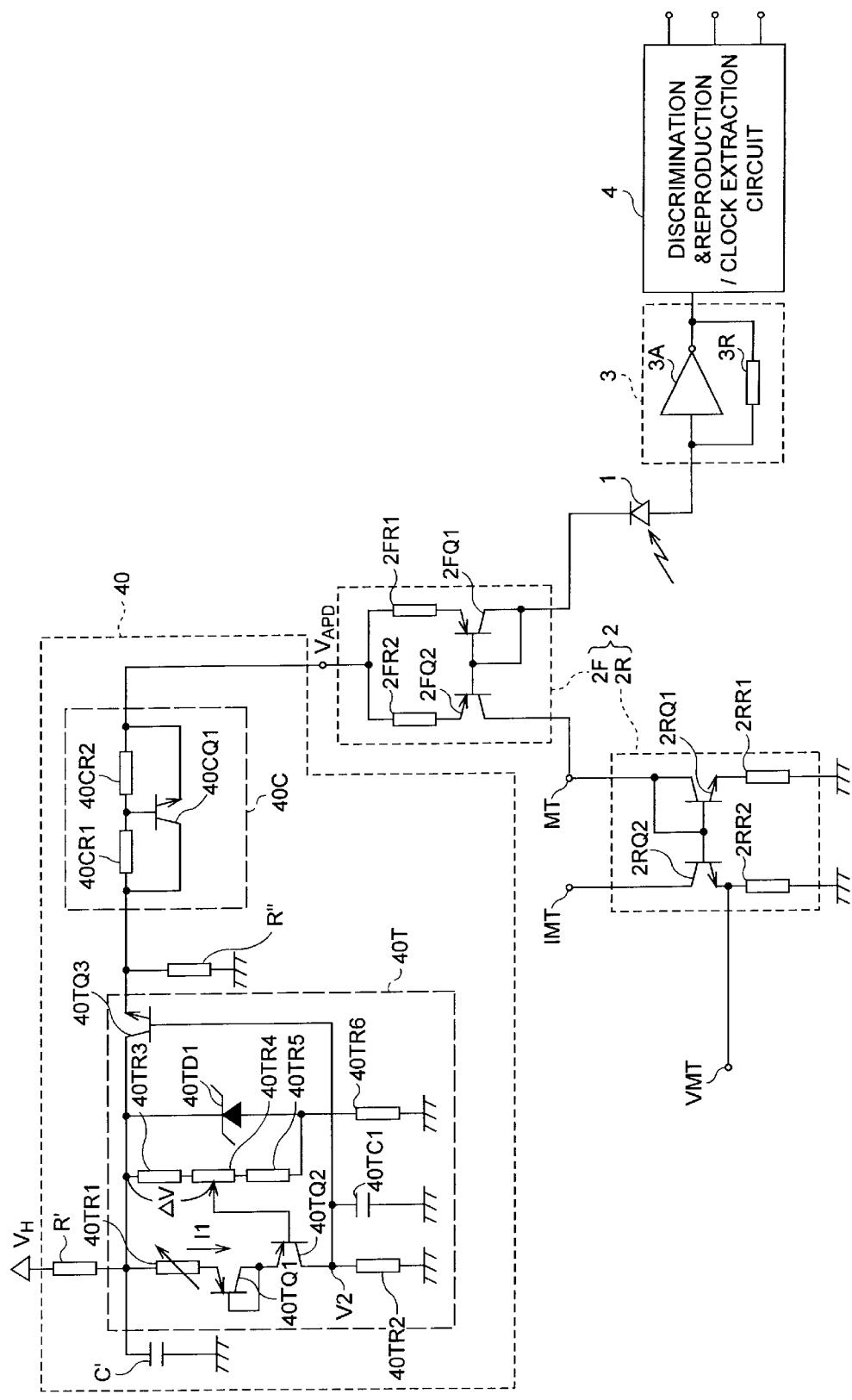
FIG. 2 is a circuit diagram of the optical module.

FIG. 2 is a circuit diagram of the above-mentioned optical module. The current mirror circuit 2 is constituted by a front-end current mirror circuit 2F and a rear-end current mirror circuit 2R which are cascaded to each other. A current mirror circuit is a circuit which operates such that the ratio of currents flowing through its parallel lines each containing a transistor becomes constant. Here, the current ratio conforms to Ohm's law, and is inversely proportional to the respective resistance values of the lines. More specifically, the current mirror circuit is a circuit in which two lines are connected in parallel such that their base-emitter voltages equal each other. Since the respective currents flowing through the transistors depend on these voltages, these currents inevitably equal each other. Also, the transistors are disposed close to each other such that their operating environments equal to each other.

Since the APD 1 is used with a reverse bias being applied thereto, the voltage drop caused by the current mirror circuit from a terminal $V_{APD}$ at a positive potential is required to be so small that the reverse bias can be sufficiently applied to the APD 1. The voltage drop in one of the transistors constituting the current mirror circuit is defined by its base-emitter voltage, which equals to the forward clamp voltage of a diode and is set to about 0.6 to 0.7 V under a normal operating condition of the transistor. As a consequence, the cathode potential of the APD 1 becomes $V_{APD}$−(0.6 to 0.7) V, whereby a sufficient reverse bias voltage would be applied to the APD 1.

The front-end current mirror circuit 2F is constituted by a pnp transistor 2FQ1 whose collector and base are short-circuited, and a pnp transistor 2FQ2 having substantially the same characteristic as the former transistor. The respective bases of the two transistors 2FQ1, 2FQ2 form a common connection, whereas their emitters are commonly connected to the terminal $V_{APD}$. Resistors 2FR1, 2FR2 are interposed between the terminal $V_{APD}$ and the respective emitters, so as to determine the ratio of currents flowing through the respective transistors 2FQ1, 2FQ2. If the values of the resistors 2FR1, 2FR2 are both zero or identical to each other, then the respective values of currents flowing through the transistors 2FQ1, 2FQ2 will equal to each other. For simplification, the resistors 2FR1, 2FR2 are assumed to have the same value in the following.

One of the parallel lines of thus configured front-end current mirror circuit 2F is connected to the APD 1, whereas the other is connected to the rear-end current mirror circuit 2R via a terminal MT. If a photocurrent is fed to the APD 1, then a current will flow into the APD 1 from the terminal $V_{APD}$ via the transistor 2FQ1, and a current equal thereto will flow into the rear-end current mirror circuit 2R.

The rear-end current mirror circuit 2R is constituted by an npn transistor 2RQ1 whose collector and base are short-circuited, and an npn transistor 2RQ2 having substantially the same characteristic as the former transistor 2RQ1. The respective bases of the two transistors 2RQ1, 2RQ2 form a common connection. The collector of one transistor 2RQ1 is connected to the terminal MT, whereas the collector of the other transistor 2RQ2 is connected to a current monitor terminal IMT.

Resistors 2RR1, 2RR2 are interposed between the ground and the respective emitters, so as to determine the ratio of currents flowing through the respective transistors 2RQ1, 2RQ2. If the values of the resistors 2RR1, 2RR2 are both zero or identical to each other, then the respective values of currents flowing through the transistors 2FQ1, 2FQ2 will equal each other. For simplification, the resistors 2FR1, 2FR2 are assumed to have the same value in the following. The emitter of the transistor 2RQ2 is connected to a voltage monitor terminal VMT.

As mentioned above, a current equal to that flowing into the APD 1 flows into the rear-end current mirror circuit 2R. In the rear-end current mirror circuit 2R, a current equal to that flowing into one transistor 2RQ1 also flows into the other transistor 2RQ2, i.e., the transistor 2RQ2 connected to the current and voltage monitor terminals IMT and VMT. Since the current equal to that flowing into the APD 1 thus flows into the transistor 2RQ2 equipped with these monitor terminals, the current flowing through the APD 1 or the voltage converted therefrom can be monitored if the current and voltage are monitored at their respective terminals IMT, VMT.

On the other hand, the photocurrent outputted from the APD 1 is converted into its corresponding voltage signal by the transimpedance amplifier 3. As the transimpedance amplifier 3, an amplifier comprising an amplifier 3A made of GaAs and a feedback resistance element 3R connected between the input and output of the former may preferably be employed.

The relationship between a current $I_{APD}$ flowing through the APD 1 and a current $I_{MTR}$ outputted from the current monitor terminal IMT disposed on the output of the current mirror circuit 2 will now be explained in brief. Here, let the base current and collector current of a transistor (with a current multiplication factor of β1) constituting the front-end current mirror circuit 2F be Ib1 and Ic1, respectively; and the base current and collector current of a transistor (with a current multiplication factor of β2) constituting the rear-end current mirror circuit 2R be Ib2 and Ic2, respectively. Namely, Ic1 and Ic2 satisfy the following relationships.

$$Ic1 = \beta 1 \cdot Ib1 \tag{Eq. 1}$$

$$Ic2 = \beta 2 \cdot Ib2 \tag{Eq. 2}$$

First, referring to the front-end current mirror circuit 2F, the current $I_{APD}$ satisfies the following relationship.

$$I_{APD} = Ic1 \text{ (transistor 2FQ1)} + Ib1 \text{ (transistor 2FQ1)} + Ib1 \text{ (transistor 2FQ2)} = Ic1 + 2 \cdot Ib1 \tag{Eq. 3}$$

From the relationship between (Eq. 3) and (Eq. 1), the collector current Ic1 satisfies the following relationship.

$$Ic1 = I_{APD}/(1 + 2/\beta 1) \tag{Eq. 4}$$

The monitor current $I_{MTR}$ in the rear-end current mirror circuit 2R, similar to the front-end current mirror circuit 2F, satisfies the following relationship.

$$I_{MTR}=Ic1/(1+2/\beta 2) \quad \text{(Eq. 5)}$$

From the relationship between (Eq. 4) and (Eq. 5), the currents $I_{APD}$ and $I_{MTR}$ satisfy the following relationship.

$$I_{MTR}=I_{APD}/(1+2/\beta 1)/(1+2/\beta 2) \quad \text{(Eq. 6)}$$

Namely, the monitor current $I_{MTR}$ would be proportional to the current $I_{APD}$ of the APD 1.

In the case where the resistance values of the resistors contained in the current mirror circuit do not equal each other, letting the respective resistance values of the resistors 2FR1, 2FR2, 2RR1, and 2RR2 be r1, r2, r3, and r4, (Eq. 4) and (Eq. 5) become (Eq. 7) and (Eq. 8), respectively, as follows.

$$Ic1=r1/r2 \cdot I_{APD}/(1+(1+r1/r2)/\beta 1) \quad \text{(Eq. 7)}$$

$$I_{MTR}=r3/r4 \cdot Ic1/(1+(1+r3/r4)/\beta 2) \quad \text{(Eq. 8)}$$

The monitor current $I_{MTR}$ would be proportional to the current $I_{APD}$ of the APD 1 in this case as well.

Using such a circuit is advantageous in that an optical power (current) monitor circuit employed in a normal optical receiver module operating at 5 V can be utilized as. Namely, in this example, no additional circuit is required to be used for monitoring the optical input power of the optical receiver using the APD 1, whereby the circuit configuration becomes simple.

The multiplication factor of the APD 1 has a temperature dependence and a bias voltage dependence. In order for the multiplication factor of the APD 1 to be substantially constant with respect to temperature change, the bias potential must compensate for the temperature dependence of the multiplication factor of the APD 1. Since the anode potential of the APD 1 is fixed by the transimpedance amplifier 3, the cathode potential, i.e., $V_{APD}$ is adjusted so as to compensate for the temperature dependence. It is necessary for the bias voltage of the APD 1 to have a positive temperature coefficient.

The reason why a bias potential with a positive temperature coefficient is applied to the APD 1 is that the bias voltage $V_B$ and the multiplication factor M shows the following relationship. Where, $\Delta T$ is the temperature difference from the reference temperature, $\gamma$ is the APD temperature coefficient of the multiplication factor of APD 1 ($\cong 0.6\%/°$ C.), Vo is the breakdown voltage at the reference temperature, and n, a value empirically determined by characteristics of the APD, is 0.106.

$$V_B = Vo \cdot (1+\Delta T \cdot \gamma) \cdot 10^{1/n \cdot \log(1-1/M)} \quad \text{(Eq. 9)}$$

Namely, in the case when the multiplication factor M is constant, the bias voltage $V_B$ of the APD 1 show a small positive temperature dependence (0.05 to 0.2 (V/° C.)). As a consequence, if the temperature coefficient of the bias voltage $V_B$ is a small positive temperature dependence, then the multiplication factor M will be constant. The bias voltage $V_B$ is lower than the terminal potential $V_{APD}$ by the voltage drop caused by the transistor 2FQ1 or that caused by the resistor 2FR1 together with the transistor 2FQ1.

Hence, neglecting the temperature dependence of this voltage drop, the temperature coefficient of the bias voltage $V_B$ can be set to be positive when the terminal potential $V_{APD}$ has a positive temperature coefficient.

The terminal potential $V_{APD}$ is set by the multiplication factor control circuit 40. The multiplication factor control circuit 40 is constituted by a temperature coefficient adjustment circuit (temperature compensation circuit) 40T for adjusting the temperature coefficient of the potential $V_{APD}$, and a shunting circuit 40C.

First, the temperature coefficient adjustment circuit 40T will be explained. A resistor R' is connected to a power source $V_H$. The downstream side of the resistor R' is assumed to be the reference potential with the temperature coefficient adjustment circuit 40T in the following explanation.

A series of resistors 40TR3, 40TR4, 40TR5 and a Zener diode 40TD1 are connected in parallel, whereas a resistor 40TR6 is disposed between this parallel circuit and the ground. Here, the resistor 40TR4 is of a variable type, its center tap being connected to the base of a transistor 40TQ2. Letting the Zener voltage of the Zener diode 40TD1 be Vz, the voltage between both ends of the series of resistors 40TR3, 40TR4, 40TR5 equals to Vz, resistor dividing ratio be k, the potential difference $\Delta V$ becomes k×Vz.

Successively connected between the power source $V_H$ and the ground are the resistor R', a variable resistor 40TR1, a pnp transistor 40TQ1 whose base and collector are short-circuited, a pnp transistor 40TQ2, and a resistor 40TR2. When the transistor 40TQ2 is turned ON, a current I1 flows from the power source $V_H$ to the ground.

The base-emitter voltage of each of the bipolar transistors 40TQ1, 40TQ2 is clamped to the forward voltage of the p-n junction diode, ranging from 0.6 V to 0.7 V. Let the base-emitter voltage of a transistor be $V_{BE}$. The voltage drop of two transistors connected in series is substantially twice $V_{BE}$.

As a consequence, potential difference $\Phi$ across the variable resistor 40TR1 is given by the following equation.

$$\Phi = \Delta V - 2V_{BE} \quad \text{(Eq. 10)}$$

Letting the resistance of the resistor 40TR1 be R1, the current I1 flowing through the variable resistor 40TR1 14 is given by the following equation.

$$I1 = (\Delta V - 2V_{BE})/R1 \quad \text{(Eq. 11)}$$

Therefore, once determining the magnitude of the current, the potential V2 is given by the following equation.

$$V2 = I1 \times R2 \quad \text{(Eq. 12)}$$

wherein R2 is the resistance of the resistor 40TR2.

The variable resistor 40TR1 is connected to the collector of an npn transistor 40TQ3. Since the output $V_R$ of the temperature coefficient adjustment circuit 40T is lower than the potential V2 by $V_{BE}$ of the transistor 40TQ3, it is given by the following equation.

$$\begin{aligned} V_R &= V2 - V_{BE} \\ &= (I1 \times R2) - V_{BE} \\ &= [(\Delta V - 2V_{BE})/R1] \times R2 - V_{BE} \\ &= [(kVz - 2V_{BE})/R1] \times R2 - V_{BE} \end{aligned} \quad \text{(Eq. 13)}$$

Capacitors C', 40TC1 are disposed such that high-frequency components and noises can be eliminated.

Temperature coefficient $\delta V_R$ of the output $V_R$ is given by the following equation.

$$\delta V_R = (k\delta V_z - 2\delta V_{BE})/R1 \cdot R2 - \\ (kV_z - 2V_{Be})/R1 \cdot R2(\delta R1/R1 - \delta R2/R2) - \delta V_{BE}$$ (Eq. 14)

where, δX denotes the temperature coefficient of X.

Since the term of δR1/R2−δR2/R2 is smaller than the other terms, it can be considered to be nearly zero, whereby the temperature coefficient δV$_R$ is approximately given by the following equation.

$$\delta V_R = (k\delta V_z - 2\delta V_{BE})/R1 \cdot R2 - \delta V_{BE}$$ (Eq. 15)

For example, letting δV$_{BE}$=−2 mV/° C., δVz=+1.2 mV/° C., k=0.8, R1=8.7 kΩ, and R2=200 kΩ, δV$_R$ becomes a small positive value, i.e., 0.116 V/° C. It is due to the fact that a Zener diode and a transistor having positive and negative temperature coefficients (V/° C.), respectively, are combined together as being connected in parallel. Since their contributions are determined by the resistor dividing ratio k and the resistance R1, the temperature coefficient can be freely adjusted by regulating the dividing ratio k and the resistance R1 in this circuit. Namely, the temperature dependence of the output V$_R$ can be adjusted by the temperature coefficient adjustment circuit 40T. The temperature coefficient of a Zener diode varies depending on the Zener voltage. In this example, the Zener diode with the Zener voltage to be about 5V is used and such a diode has positive temperature coefficient.

The multiplication factor M of the APD 1 has a temperature dependence and a bias voltage dependence. As mentioned above, while the temperature dependence of the output V$_R$ of the temperature coefficient adjustment circuit 40T can be freely adjusted, the bias voltage VB directly applied to the APD 1 becomes lower than the output potential V$_R$ by about 2 V$_{BE}$ or by the sum of this value and the resistance of the resistor 2FR1 by passing through the shunting circuit 40C and the front-end current mirror circuit 2F.

The potential V$_B$ lower than V$_R$ is supplied to the APD 1. Since the temperature characteristic of the circuits 40C, 40F does not much change, a voltage having a positive temperature coefficient is applied to the APD 1.

The shunting circuit 40C will now be explained in brief. The shunting circuit 40 is interposed between the temperature coefficient adjustment circuit 40T and the front-end current mirror circuit 2F. It is constituted by a series of resistors 40CR1, 40CR2 and an npn transistor 40CQ1 connected thereto in parallel. In the case where a very weak current flows through the series of resistors 40CR1, 40CR2, the resulting voltage drop is so small that the base-emitter voltage of the npn transistor 40CQ1 would not exceed the forward bias potential of the p-n junction (0.6 to 0.7 V), whereby the transistor 40CQ1 is kept in OFF state, thus making almost all the current flow into the front-end current mirror circuit 2F via the series of resistors 40CR1, 40CR2.

The magnitude of current flowing through the series of resistors 40CR1, 40CR2 becomes greater, the voltage across the resistor 40CR2 is larger than 0.6 to 0.7V. Namely, the base-emitter voltage of the npn transistor 40CQ1 exceeds its threshold, whereby the transistor 40CQ1 is turned ON, so as to form a low-resistance bypass between the input and output of the shunting circuit 40C. Since the shunting circuit 40C has a low resistance, it can apply a high bias voltage to the APD 1.

If the magnitude of current flowing through the bypass further increases, then the magnitude of current flowing through the series of resistors 40CR1, 40CR2 will relatively decrease.

The above-mentioned optical module was prepared, and its characteristics were evaluated. Devices with V$_{CE}$ (collector-emitter break down voltage) of 150 V and 3 of about 80 were used for the above-mentioned pnp and npn transistors, each of the resistors r1 and r2 was 10 kΩ, each of the resistors r3 and r4 was 2.4 kΩ, and +5 V was applied to the APD current monitor terminal IMT. A proportional relation such as shown in the FIG. 3 was obtained within the range of the APD current I$_{APD}$ from 10 to 100 μA.

Figure 3:
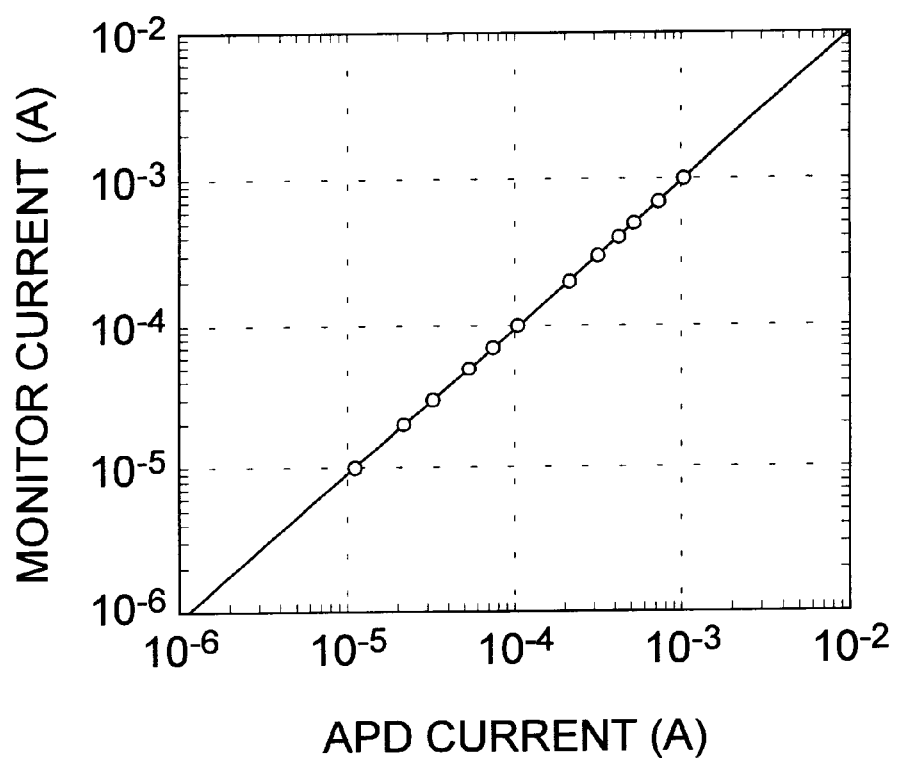
FIG. 3 is a graph showing the relationship between the current $I_{APD}$ flowing through the APD 1 and its monitor current $I_{MTR}$.

In FIG. 3, the relationship between the monitor current I$_{MTR}$ and the current I$_{APD}$ of the APD 1 is as follows:

$$I_{MTR}=0.948 \times I_{APD}$$ (Eq. 16)

Here, the voltage output proportional to the photocurrent can also be taken out from the emitter of the transistor 2RQ2.

Though the above-mentioned circuits are implemented within the optical module, part of the circuits may be disposed outside thereof. The circuits may be integrated in the same semiconductor chip or on the same wiring board. When the circuit conditions are adjusted, a PIN photodiode or the like may be employed in place of the APD 1. For example, a PIN photodiode made of InGaAs having a diameter of 50 μm is employed preferably. Further, the type of package is not limited to the above resin mold type. For example, a metal type package, a plastic type package or the like is applicable.

Though the bias circuit is connected to the cathode of the APD 1, it can be connected to the anode as well upon a simple alteration of the design.

A current mirror circuit includes various configurations, and other circuit operating similarly to that mentioned above can also be employed. For example, a field-effect transistor (FET) can be used in place of the bipolar transistor.

As explained in the foregoing, the above-mentioned photocurrent monitor circuit comprises the photodiode 1 for receiving an optical signal; the first current mirror circuit 2F having two parallel lines with respective currents flowing therethrough in proportion to each other, one of the lines connecting with one end of the photodiode 1; the second current mirror circuit 2R having one of parallel lines connected to the other line of the first current mirror circuit 2F; and the photocurrent monitor terminal IMT connected to the other of the parallel lines of the second current mirror circuit 2R.

From the invention thus described, it will be obvious that the invention may be varied in many ways. Such 19 variations are not to be regarded as a departure from the spirit and scope of the invention, and all such modifications as would be obvious to one skilled in the art are intended for inclusion within the scope of the following claims.

What is claimed is:

1. A photocurrent monitor circuit comprising a photodiode for receiving an optical signal; a first current mirror circuit having two parallel lines with respective currents flowing therethrough in proportion to each other, one of said lines connecting with one end of said photodiode; a second current mirror circuit having one of parallel lines connected to the other line of said first current mirror circuit; and a photocurrent monitor terminal connected to the other of said parallel lines of said second current mirror circuit.

2. A photocurrent monitor circuit according to claim 1, wherein said first and second current monitor circuits are constituted by bipolar transistors having polarities opposite to each other.

3. A photocurrent monitor circuit according to claim 2, wherein said photodiode is an avalanche photodiode, and wherein one of said bipolar transistors constituting said first current mirror circuit has a collector connected to said photodiode and an emitter connected to a multiplication factor control circuit for supplying a bias potential with a positive temperature coefficient to said emitter.

4. A photocurrent monitor circuit according to claim 3, wherein said multiplication factor control circuit comprises a temperature compensation circuit in which a Zener diode having a positive temperature coefficient and a transistor whose base-emitter voltage has a negative temperature coefficient are connected in parallel.

5. An optical receiver comprising the photocurrent monitor circuit according to claim 1 and a transimpedance amplifier connected to the other end of said photodiode.

\* \* \* \* \*